United States Patent [19]
Smith et al.

[11] Patent Number: 5,845,028
[45] Date of Patent: Dec. 1, 1998

[54] ALIGNMENT ASSEMBLY FOR MULTIFIBER OR SINGLE FIBER OPTICAL CABLE CONNECTOR

[75] Inventors: Terry L. Smith, Roseville; Gordon D. Henson, Lake Elmo, both of Minn.

[73] Assignee: Minnesota Mining and Manufacturing Company, St. Paul, Minn.

[21] Appl. No.: 953,950

[22] Filed: Oct. 20, 1997

Related U.S. Application Data

[62] Division of Ser. No. 614,142, Mar. 12, 1996.

[51] Int. Cl.⁶ ..................................................... G02B 6/38
[52] U.S. Cl. .................................................................. 385/59
[58] Field of Search ................... 385/59, 65, 69, 385/76, 89, 52, 53, 58, 114

[56] References Cited

U.S. PATENT DOCUMENTS

| | | | |
|---|---|---|---|
| 4,037,902 | 7/1977 | Miller | 339/49 R |
| 4,087,155 | 5/1978 | Deacon | 350/96.21 |
| 4,094,580 | 6/1978 | Cook et al. | 350/96.21 |
| 4,116,532 | 9/1978 | Hubbard et al. | 385/53 |
| 4,184,742 | 1/1980 | Corrales | 350/96.21 |
| 4,279,466 | 7/1981 | Makuch et al. | 350/96.21 |
| 4,279,468 | 7/1981 | Turley et al. | 385/59 |
| 4,712,861 | 12/1987 | Lukas et al. | 350/96.21 |
| 4,737,118 | 4/1988 | Lockard | 439/289 |
| 4,953,944 | 9/1990 | Moulin | 350/96.21 |
| 5,121,457 | 6/1992 | Foley et al. | 385/89 |
| 5,123,073 | 6/1992 | Pimpinella | 385/59 |
| 5,151,964 | 9/1992 | Carpenter et al. | 385/98 |
| 5,183,409 | 2/1993 | Clever et al. | 439/291 |
| 5,214,730 | 5/1993 | Nagasawa et al. | 385/59 |
| 5,257,332 | 10/1993 | Pimpinella | 385/59 |
| 5,257,334 | 10/1993 | Takahashi | 385/65 |
| 5,315,678 | 5/1994 | Maekawa et al. | 385/59 |
| 5,333,225 | 7/1994 | Jacobowitz et al. | 385/93 |
| 5,339,376 | 8/1994 | Kakii et al. | 385/71 |
| 5,416,868 | 5/1995 | Kakii et al. | 385/80 |
| 5,420,952 | 5/1995 | Katsura et al. | 385/80 |
| 5,422,971 | 6/1995 | Honjo et al. | 385/80 |
| 5,430,819 | 7/1995 | Sizer, II et al. | 385/59 |
| 5,727,097 | 3/1998 | Lee et al. | 385/58 |
| 5,778,123 | 7/1998 | Hagan et al. | 385/76 |

FOREIGN PATENT DOCUMENTS

| | | |
|---|---|---|
| 0 707 225 A1 | 4/1996 | European Pat. Off. . |
| 3409641 A1 | 9/1985 | Germany . |
| Hei 7-20340 | 1/1995 | Japan . |

*Primary Examiner*—Akm E. Ullah
*Attorney, Agent, or Firm*—Nestor F. Ho; H. Sanders Gwin

[57] ABSTRACT

The present invention provides a precise optical fiber cable connector for aligning and connecting ends of a pair of cables. The connector has a fiber alignment block having a fiber receiving surface and a connector engagement surface. First and second openings are provided in the connector engagement surface. An alignment ball is provided and is retained in the first opening. The alignment ball is for aligning the connector with another like connector, and specifically, for aligning optical fibers carried on the connector alignment assemblies.

11 Claims, 7 Drawing Sheets

ALIGNMENT ASSEMBLY FOR MULTIFIBER OR SINGLE FIBER OPTICAL CABLE CONNECTOR

This is a Division of application Ser. No. 08/614,142 filed Mar. 12, 1996.

FIELD OF THE INVENTION

The present invention relates generally to connectors for optical fibers. In particular, the present invention relates to an alignment assembly for an optical fiber cable connector having alignment balls retained on a face of a fiber alignment block for alignment purposes.

BACKGROUND OF THE INVENTION

Fiber optic cables are well known for the transmission of optical signals. Use of optical cable has generally been limited to long haul trunking installations where the improved transmission characteristics of the optical fibers justify the greater expense and difficulties associated with their manufacturing and installation. As the demands on communication media continue to increase, the advantages of using optical cable for transmission of signals across shorter distances or, for interconnecting local devices, continues to grow. Much development work has been devoted to the provision of practical low loss glass materials and production techniques for producing glass fiber cable, such as optical fiber ribbon cables. Obviously, if fiber optic cables are to be used in practical signal transmission and processing systems, practical connectors for the connection and disconnection of fiber optic cables must be provided.

Of considerable relevance to the problem of developing practical fiber optic connectors is the question of optical transfer efficiency at the connector. Various factors affect the optical transfer efficiency at a connector including gap separation at the point of abutment, and lateral separation due to axial misalignment.

Numerous optical connectors have been developed to aid in the connection of fiber optic ribbon cables. Examples of pin-type connectors are shown and described in U.S. Pat. No. 5,315,678 issued to Maekawa, et al., and U.S. Pat. No. 5,430,819, issued to Sizer, II, et al. Both the '819 and the '678 patents describe methods for using alignment pins for aligning connector portions. There are several problems encountered when using alignment pins which can be alleviated by using alignment spheres. First, precise, tight tolerance alignment pins are difficult to fabricate and thus expensive. In contrast, well understood ball bearing manufacturing techniques can produce precise, tight tolerance spheres at significantly lower cost. Second, small alignment pins are neither robust nor durable, regardless of composition; brittle pins tend to break, while ductile pins tend to bend. Spheres, by virtue of their symmetrical shape, tend neither to break nor to bend. Third, aligning parts using two or more pins mechanically overconstrains the alignment and requires that the angular orientation, location, and extended cross-sectional diameter of each pin socket, as well as the diameter and straightness of each pin, be tightly controlled to avoid compounding errors which degrade the alignment. In contrast, alignment using spheres depends only on the diameter of the spheres and the accurate location of the sockets which retain them, thus eliminating overconstraint and the potential for compounding errors.

U.S. Pat. No. 4,087,155 issued to Deacon discloses a method for aligning a pair of single fibers that does not use alignment pins. Specifically, the Deacon '155 patent discloses a connector for coupling a pair of single optical fibers utilizing three equal diameter spheres to define a tricuspid interstitial space therebetween into which an individual fiber is inserted. The spheres surround the circumference of the fiber to keep the fiber centered in the connector, which has a circular race to hold the spheres. When a second like connector is mated in an axial abutting relationship, the spheres in the connectors nest with respect to each other to align the individual fibers. In order to properly align single fibers in this manner, it is imperative that the equal diameter spheres surround the entire circumference of the single fiber. Unfortunately, the technique described in the Deacon '155 patent is not applicable to multifiber cables such as ribbon cables.

While there are connectors designed for both single-and multi-fiber optical cables, there is a continued need for durable, precise, inexpensive and easy to manufacture optical connectors that will accurately align multiple optical fibers in two adjoining connectors.

SUMMARY OF THE INVENTION

The present invention provides a precise alignment assembly for an optical fiber cable connector for aligning and connecting ends of a pair of multifiber or single fiber optical cables. The alignment assembly would be combined with additional connector components, such as fiber strain relief members and connector latching members, to form a complete fiber optic connector. The alignment assembly has a fiber alignment block having a fiber receiving surface and a connector engagement surface. First and second openings are provided in the connector engagement surface. An alignment ball is provided and is tightly retained in the first opening for aligning the connector with another like connector, and specifically, for aligning optical fibers carried in the connectors.

The present invention also provides an optical cable connector alignment assembly having a securing member for securing individual fibers from a cable onto the alignment assembly. The alignment assembly has a fiber alignment block that has a fiber receiving surface and a connector engagement surface. The fiber receiving surface has a channel formed in it with at least one alignment groove formed in the channel. A securing member is provided that is sized to fit into the channel to retain individual fibers in the alignment grooves. First and second openings are provided in the connector engagement surface. An alignment ball is provided and is tightly retained in the first opening for aligning the connector alignment assembly with another like connector alignment assembly, and specifically, for aligning optical fibers carried in the connectors.

Also disclosed is a method for assembling such connector alignment assemblies to a fiber optic ribbon cable. A pair of alignment assemblies are provided and are placed in a face to face arrangement. The alignment assemblies are appropriately spaced apart by a spacing member. A length of cable, optionally prepared for insertion in the alignment assemblies by removing some or all of the cabling and fiber coating material from a section of the fibers, is then provided on top of the alignment assemblies. A securing member is then installed to retain the individual fibers from the cable in the alignment grooves of the alignment assemblies. The length of cable is then sawed or cleaved between the alignment assemblies. Finally, any necessary end finishing or polishing is done.

DETAILED DESCRIPTION OF THE INVENTION

Figure 1:
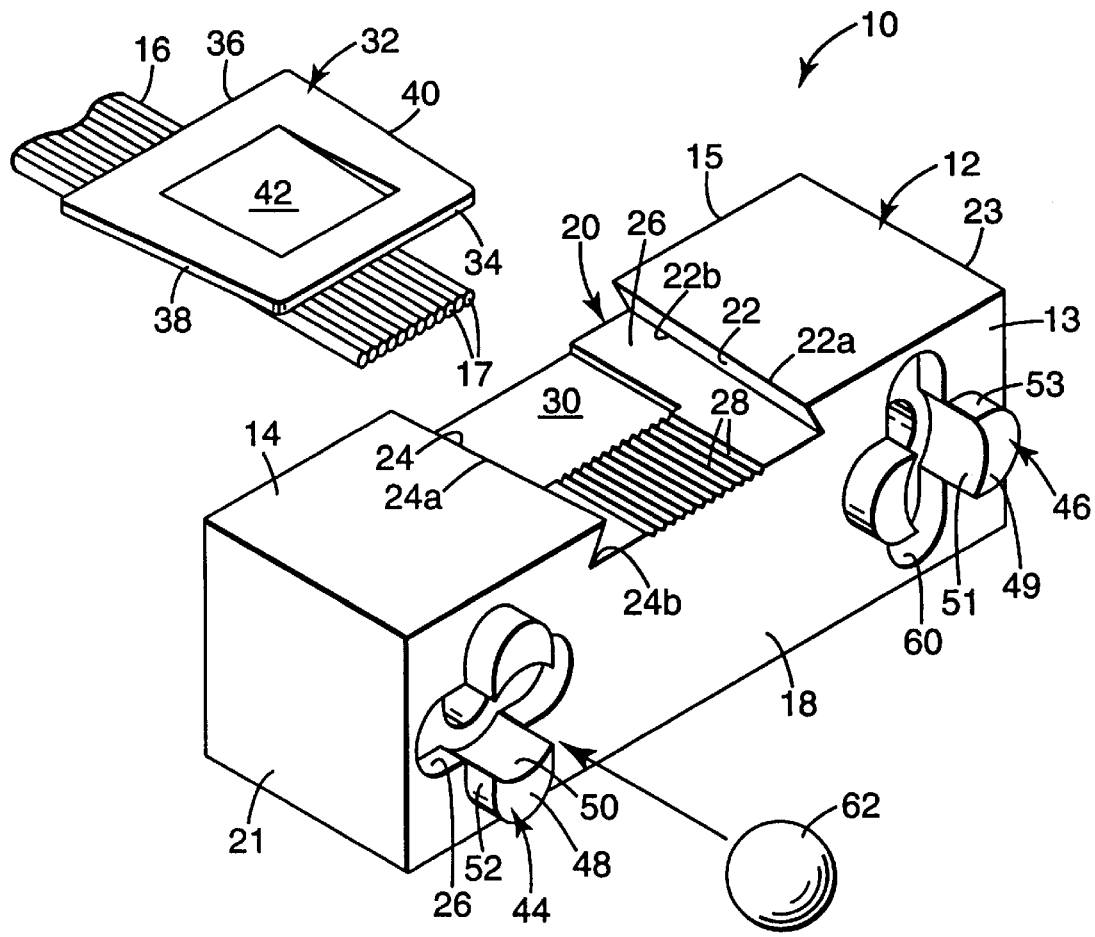
FIG. 1 is a perspective view of an optical cable connector alignment assembly according to the present invention.

FIG. 1 illustrates an optical cable connector alignment assembly 10 according to one embodiment of the present invention. Alignment assembly 10 has a fiber alignment block 12 having a front edge 13, a rear edge 15, an optical fiber receiving surface 14 which engages an optical cable 16, a connector engagement surface 18 which abuts a connector engagement surface on another like connector alignment assembly, a rear face 19 (illustrated in FIG. 3a), a first side surface 21 and a second side surface 23 (not seen). Cable 16 is comprised of one or more individual optical fibers 17, and in the preferred embodiment the individual optical fibers are positioned adjacent one another in a substantially planar orientation to form a ribbon cable.

Fiber receiving surface 14 contains a channel 20 formed out of fiber alignment block 12. The channel contains first and second channel retaining lips 22, 24 respectively, and a channel floor 26. Retaining lips 22, 24 are angled outward from front edge 13 to rear edge 15 to form a trapezoidal shaped channel. Specifically, as retaining lip 24 extends from front edge 13 to rear edge 15, it angles towards first side surface 21. As retaining lip 22 extends from front edge 13 to rear edge 15, it angles toward side surface 23. Also, retaining lips 22, 24 are slanted from top to bottom to form a locking mechanism. Preferably, retaining lips 22, 24 are formed from upper lip edges 22a, 24a and lower lip edges 22b, 24b, respectively. Retaining lips 22, 24 slant in at approximately a 30 degree angle such that lower lip edges 22b, 24b are closer to side edges 23, 21, respectively than are upper lip edges 22a, 24a. It should be noted that greater or lesser angles of slant could be used without departing from the spirit or scope of the invention.

One or more alignment grooves 28 are formed in channel floor 26 to retain individual fibers 17 from fiber optic cable 16. Alignment grooves 28 of the preferred embodiment are illustrated as being V shaped grooves, but grooves of other cross sectional shapes, such as rectangular, U shaped or semi-circular shaped grooves could also be used without departing from the spirit or scope of the invention. Also formed in channel floor 26 is a cable jacket receiving channel 30. In normal operation, fiber optic cable 16 will be partially stripped to expose individual fibers 17 for placement into alignment grooves 28. The cable jacket and optionally any fiber coating surrounding individual fibers 17 will be stripped back a distance at least equal to the length of alignment grooves 28. By providing cable jacket receiving channel 30, individual fibers 17 may maintain a substantially planar path throughout the entire width of fiber alignment block 12.

Connector engagement surface 18 and fiber receiving surface 14 in the preferred embodiment are planar surfaces that lie perpendicular to each other. It is also possible, and in some cases beneficial, to have the plane of connector engagement surface 18 a few degrees (preferably 6°–9°) from being perpendicular with fiber receiving surface 14, in order to reduce back reflection of light within the fibers. The fiber receiving surface could be either 6°–9° up or down from horizontal without departing from the spirit or scope of the invention. In other words, the angle between fiber receiving surface 14 and connector engagement surface may be in the range of 81°–99°.

The optical fibers of the present invention may be single or multimode, glass or plastic fibers. Multimode glass fibers typically have a core diameter ranging from 50–100 micrometers. Single mode fibers have smaller core diameters. Because the multimode fibers have larger core diameters, they offer relaxed alignment tolerances compared to single mode fibers.

A dove tail retaining member 32 having a front edge 34, a rear edge 36 and side members 38, 40, is provided to secure cable 16 in channel 20, and in particular each of individual fibers 17 in alignment grooves 28. An assembly detent 42 is provided on retaining member 32 to assist in installing the retaining member. In the present embodiment dove tail member 32 is trapezoidal in shape with front edge 34 being shorter than rear edge 36. Side members 38 and 40 are substantially the same size. Dove tail member 32 substantially conforms to the size and shape of channel 20 and is sized to engagingly slide under channel retaining lips 22 and 24. Retaining member 32 has a width at front edge 34 greater than the distance between upper lip edges 22a, 24a and lesser than the distance between lower lip edges 22b, 24b at front edge 13, and has a width at rear edge 36 greater than the distance between upper lip edges 22a, 24a and lesser than the distance between lower lip edges 22b, 24b at rear edge 15. Retaining member 32 has a height less than the vertical distance from channel floor 26 to upper lip edges 22a, 24a. The height of retaining member 32 is approximately 2 mm, but greater or lesser heights can be used without departing from the spirit or scope of the invention. Retaining member 32 is sized such that front edge 34 is wider than channel 20 is at front edge 13, to ensures that when retaining member 32 is installed in channel 20, front edge 34 does not extend past front edge 13 and prohibit tight engagement with opposing connectors.

Fiber alignment block 12 and retaining member 32 are molded out of ceramic in the preferred embodiment. It would also be possible to make fiber alignment block 12 out of plastic, glass, metal, or any other known connecting block material. By using a moldable material in the preferred embodiment, fiber alignment block 12 may be quickly and easily manufactured as a one piece unit. For example, instead of having to carve out channel 20, and alignment grooves 28, in the preferred embodiment they can simply be created by the molding process.

Connector engagement surface 18 contains a first and a second opening 44, 46 respectively. Castellated projections 48, 49 are provided and project from fiber alignment block 12 substantially parallel to each other and optionally substantially perpendicular to connector engagement surface 18. Projections 48, 49 are positioned adjacent openings 44, 46, respectively, and are integrally molded as part of fiber alignment block 12. In the preferred embodiment, castellated projections 48, 49 extend from engagement surface 18 approximately ½ the diameter of an alignment ball 62, which will be described in greater detail below. As can be seen in FIG. 1, projections 48, 49 have rounded inner 50, 51 and outer 52, 53 surfaces respectively. Rounded inner surfaces 50, 51 are adapted to receive the alignment ball, while outer surface 52, 53 are adapted to clearance fit into openings 44, 46 as will be described in detail below.

Figure 2:
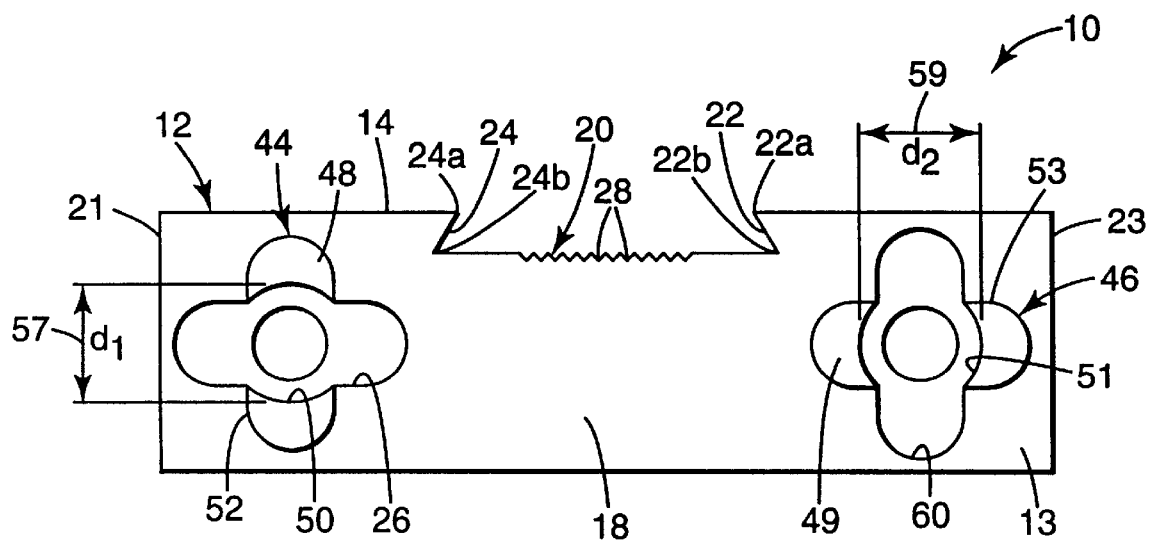
FIG. 2 is a front plan view of the alignment assembly of FIG. 1.

Openings 44, 46 can be seen in greater detail in FIG. 2. As can be seen, openings 44, 46 are substantially similar in shape, but opening 46 is rotated 90 degrees from opening 44. The purpose of this will be readily apparent after reading the description below. Opening 44 comprises a main cylindrical receiving cavity 54 and a pair of clearance cavities 56. Opening 46 comprises a main cylindrical receiving cavity 58 and a pair of clearance cavities 60. Main cylindrical cavities 54, 58 have diameters $d_1$, $d_2$, respectively, indicated by arrows 57, 59, respectively. Diameters $d_1$, $d_2$ correspond to the distance between castellated projections 48, 49, respectively. In the preferred embodiment of the present invention, diameter $d_2$ of cylindrical cavity 58 is slightly larger than diameter $d_1$ of cylindrical cavity 54, and accordingly the distance between projections 49 is slightly greater than the distance between projections 48. In the preferred embodiment, the difference in diameters $d_1$, $d_2$ is on the order of a few microns. The precise dimensions will depend upon the type of fiber and connector materials selected.

As can be seen in FIG. 2, clearance cavities 56 and castellated projections 48 substantially surround main cylindrical cavity 54. Likewise, castellated projections 49 and clearance cavities 60 substantially surround main cylindrical cavity 58. Clearance cavities 56, 60 are shaped substantially similar to castellated projections 48, 49 respectively, and are deep enough to completely receive the projections. It is important that clearance cavities 56, 60 be at least as deep as the castellated projections 48, 49 so that when two connectors are joined, their engagement surfaces 18 can contact each other, thus allowing the ends of the optical fibers carried by each connector to be in close proximity.

Precision alignment ball 62 is provided for insertion into opening 44 between castellated projections 48. Precision alignment ball 62 is provided to precisely align fibers 17 in alignment grooves 28 for alignment with fibers in another like connector, as will be described below. Ball 62 is a highly precise steel ball bearing but could also be formed from other materials having the precision of a ball bearing such as tungsten carbide, ceramic, other metals, or plastics, such as liquid crystal polymers, without departing from the spirit or scope of the invention. In the preferred embodiment, ball 62 has a diameter of approximately 2 mm and a diameter tolerance of approximately ±0.5 microns. It is important to note that tolerances will vary depending upon the material used for the alignment ball. While the tolerance ranges are important to the proper operation of the present invention, it will be recognized that greater or lesser diameters may be used, without departing from the spirit or scope of the invention.

As stated above, $d_1$ of main cylindrical cavity 54, and therefor the distance between projections 48, is slightly smaller than $d_2$ of cavity 58. This is to tightly retain ball 62 in cavity 54. Castellated projections 49 are designed such that the distance between them ($d_2$) allows them to releasably slide about ball 62. If ball 62 was inserted into opening 46, it would not be tightly retained and could fall out. The tolerances for the distances between projections 48, 49 once again depend upon the material used. In the preferred embodiment, ceramic is used for the fiber alignment block, including the projections. In this case, the tolerance for the distance between projections 48 (which form an interference fit with the alignment ball) is approximately ±2–3 microns, and the tolerance for the distance between projections 49 (which form a clearance fit with the alignment ball) is approximately ±0–2 microns. If plastic is used for the projections, the tolerance for the distance between projections 48 is approximately ±50 microns and for projections 49 is approximately ±50 microns.

It is important to note that in the present embodiment, ball 62 need not be at any specific depth or position in cavity 54, between projections 48. Ball 62 may be retained between projections 48 entirely outside of cavity 54, it may be half inside of cavity 54 and half outside, or it may be entirely inside of the cavity, or anywhere in between, without altering the alignment capabilities of the present invention. It should also be noted that ball 62 could be bonded between projections 48, if desired, without departing from the spirit or scope of the invention. Furthermore, it should be noted that it would be possible to have cylindrical cavities 54, 58 the same size, such that both cavities slidingly receive alignment ball 62. While such an embodiment would not prevent ball 62 from falling out of a cavity when connectors are not mounted together, it would give additional freedom in deciding which cavity to insert the ball into.

Figure 3A:
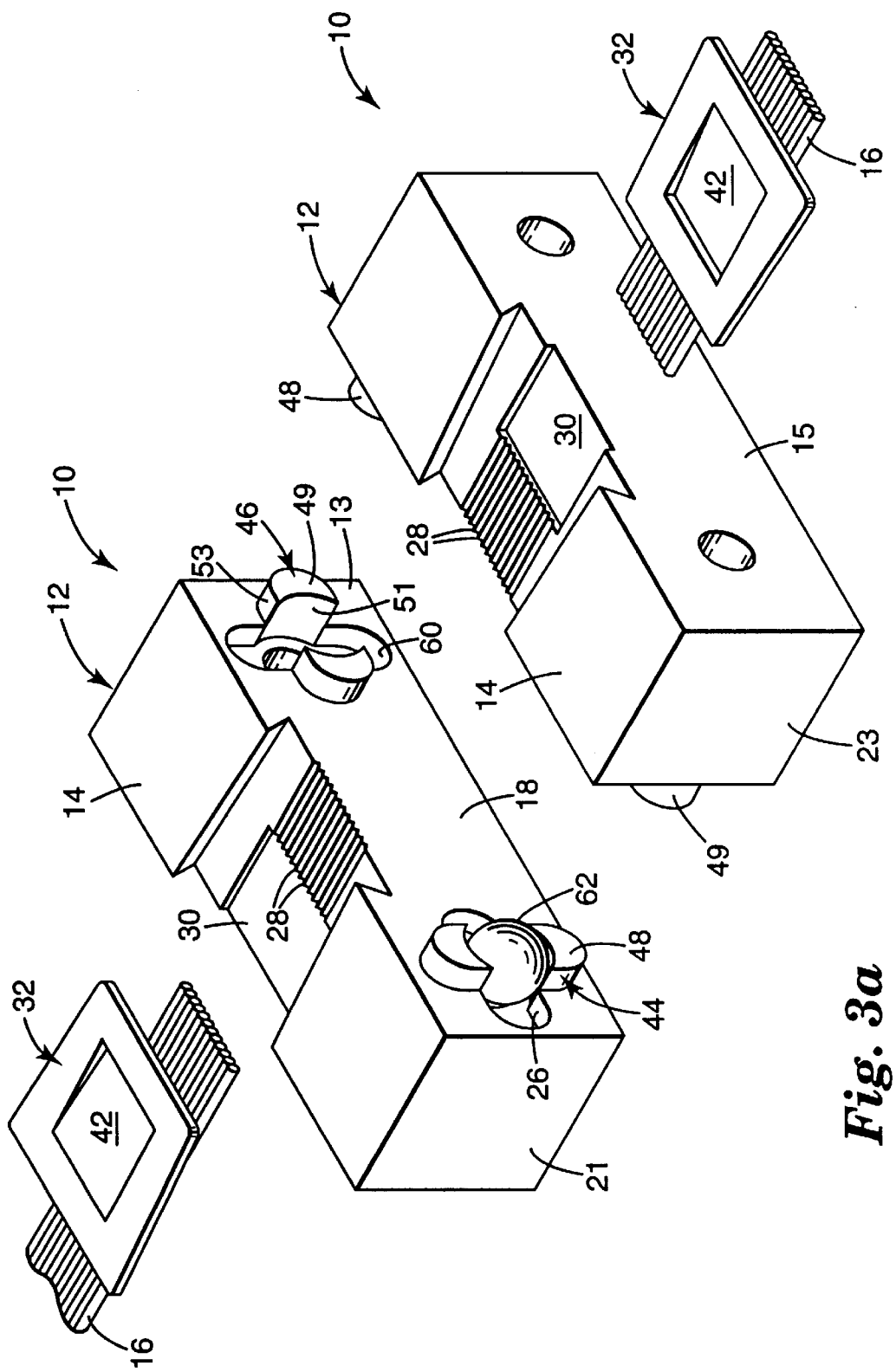
FIG. 3a is a perspective view of a pair of alignment assemblies according to the present invention about to be connected.
Figure 3B:
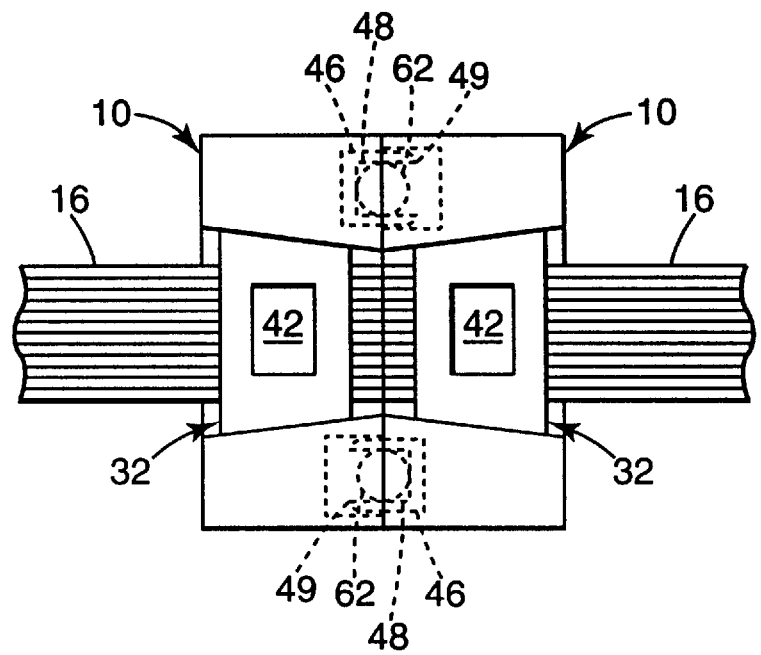
FIG. 3b is a perspective view of the alignment assemblies in FIG. 3a connected.
Figure 4A:
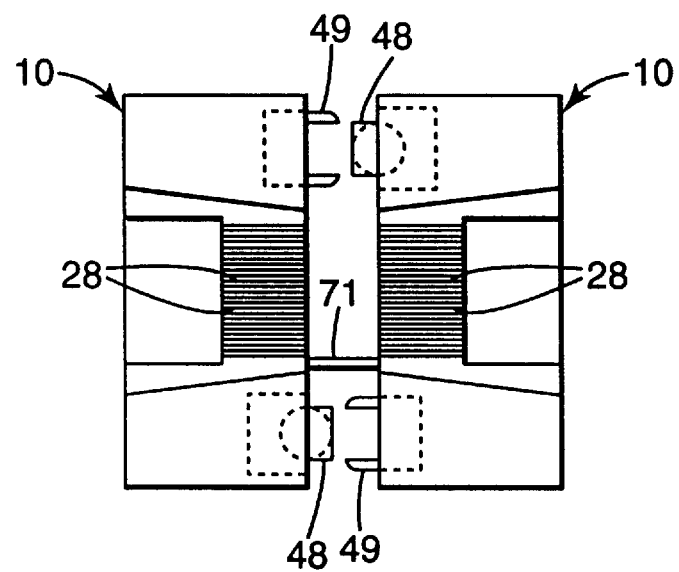
FIGS. 4a–d illustrate an assembly process for assembling a plurality of alignment assemblies in accordance with the present invention with a multifiber optical cable.
Figure 4B:
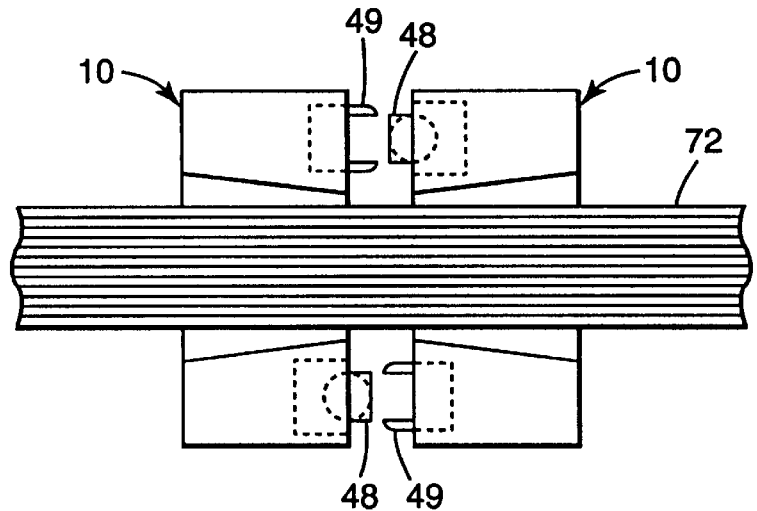
Figure 4C:
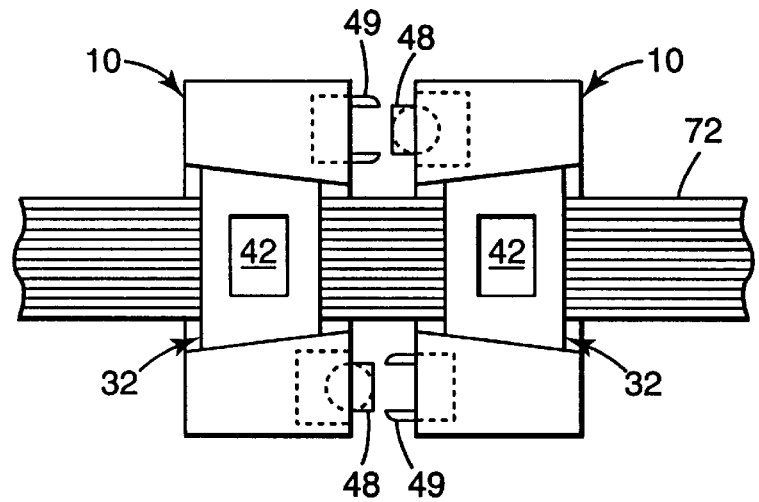
Figure 4D:
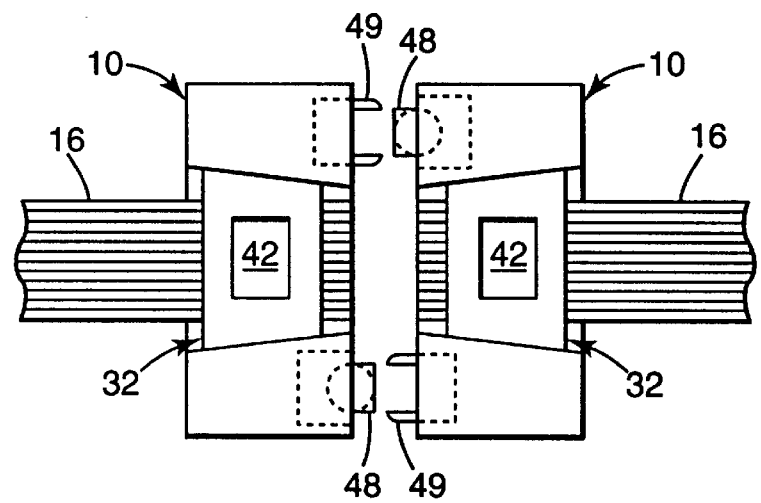

FIGS. 3a and 3b illustrate two connector alignment assemblies made according to the present invention being precisely fitted together. Connector alignment assemblies 10 are illustrated having fiber optic ribbon cables 16 retained in alignment grooves 28 by retaining member 32. As can be seen, balls 62 have been inserted into receiving cavities 54 of both connector alignment assemblies 10. Castellated projections 48 provide a tight fit to retain ball 62 in cavity 54. As the connector alignment assemblies are brought together, castellated projections 48 fit into clearance cavities 60 and projections 49 fit into clearance cavities 56. Rounded inner surfaces 51 of projections 49 slidingly engage ball 62 as they are inserted into clearance cavities 56. When connected, as in FIG. 3b, individual fibers 17 of ribbon cables 16 are precisely aligned with each other, and the connector alignment assemblies are constrained from moving in multiple directions.

The present invention also provides a method of automating the assembly of connector alignment assemblies 10 with a ribbon cable. This method is illustrated schematically in FIGS. 4a–d. As can be seen, a pair of connector alignment assemblies 10 are provided and are positioned in a face to face arrangement. In the preferred embodiment, a spacing member 71 is provided to space connector alignment assemblies 10 an appropriate distance apart. Spacing member 71 of the present invention is a disposable spacer that spaces the alignment assemblies approximately 0.015 inch (0.038 cm) apart, but greater or lesser distances may be chosen without departing from the spirit or scope of the invention. Spacer 71 is preferably made of plastic, but any other suitable spacing material may also be used. Connector alignment assemblies 10 may also be secured in place by some sort of clamping mechanism without departing from the spirit or scope of the invention.

Once the connector alignment assemblies are appropriately spaced apart, a length of fiber optic ribbon cable 72 is provided from a continuous roll or similar continuous supply. The ribbon cable is positioned over connector alignment assemblies 10 such that individual fibers are positioned in each of alignment grooves 28. A retaining member 32 is then installed on both alignment assemblies 10 to tightly retain the ribbon cable on the connector alignment assemblies. At this point, ribbon cable 72 is then sawed or cleaved at the location of spacer 71. Finally, any necessary finishing or polishing of the fiber ends is done. The above method is also equally applicable to assembling a single connector to the end of a length of ribbon cable.

Figure 5A:
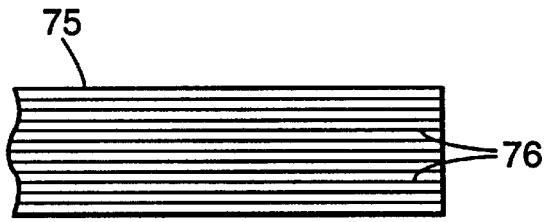
FIGS. 5a–c illustrate an assembly process for applying an alignment assembly in accordance with the present invention to an end of an optical cable.
Figure 5B:
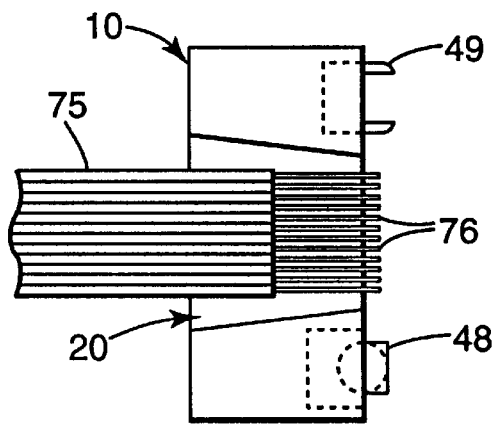
Figure 5C:
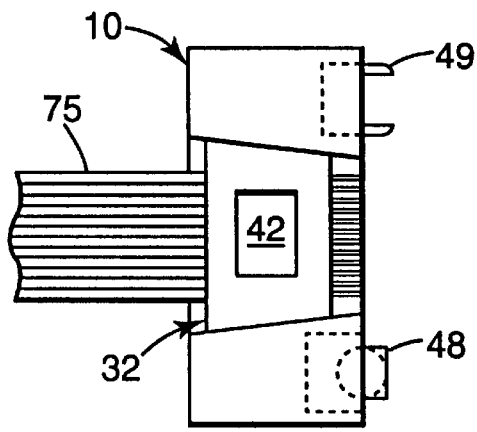

The connector alignment assemblies of the present invention are also very well suited for easy field connectorization. This type of manual, field connectorization process is illustrated in FIGS. 5a–c. In the field, a technician first locates a desired location for connector 10 along a length of ribbon cable 75. The cable is then cut at that point. The insulation coating about the fibers is then stripped to expose individual fibers 76. The individual fibers are then placed directly above alignment grooves 28 of the alignment assembly. Next, retaining member 32 is slid into channel 20 of the alignment assembly to tightly retain fibers 76 in alignment grooves 28. The portion of the fibers extending beyond connector engagement surface 18 is then cut off, and any necessary finishing or polishing is then performed.

Figure 6:
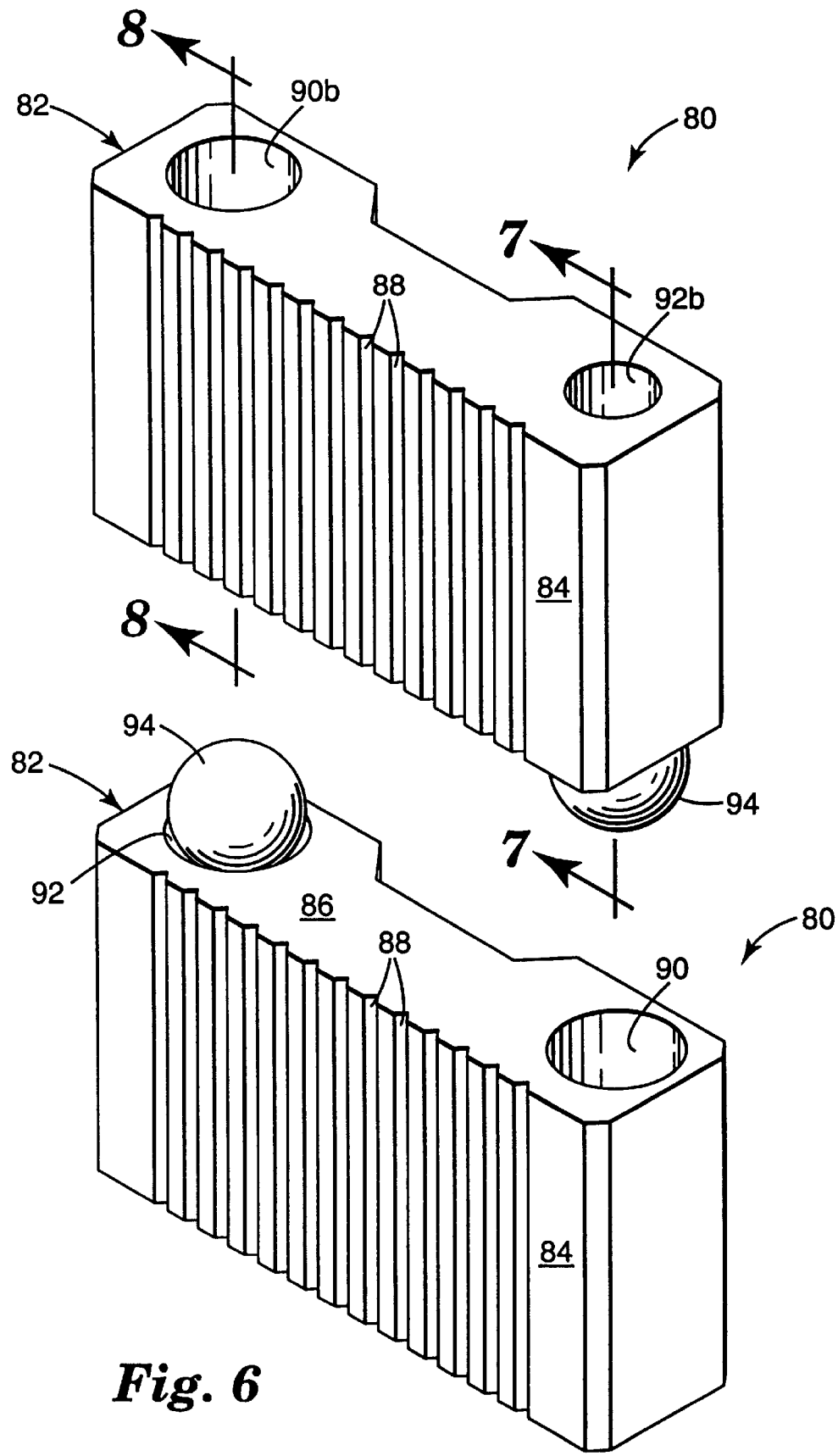
FIG. 6 is a perspective view of an alignment assembly of an alternative embodiment of the present invention.

A first alternative embodiment of the present invention is illustrated in FIG. 6. FIG. 6 illustrates a pair of like alignment assemblies 80 about to be joined together. Alignment assembly 80 comprises a fiber alignment block 82 that has an optical fiber receiving surface 84 and a connector engagement surface 86, which abuts a connector engagement surface of another like connector. In this embodiment, fiber alignment block 82 is molded out of ceramic or glass. A plurality of alignment grooves 88 are formed in fiber receiving surface 84 to retain individual fibers from a fiber optic cable. The fibers are retained in alignment grooves 88 by any known securing means, such as with adhesive tape or a bonding agent.

Connector engagement surface 86 contains a first and second opening 90, 92, respectively. Openings 90, 92 are connected to bores 90a, 92a, respectively, that continue though the length of alignment assembly 80 and terminate at rear openings 90b, 92b, respectively. Bores 90a, 92a and rear openings 90b, 92b can be seen in greater detail in FIGS. 7 and 8. Opening 90 is sized to receive a substantial portion of an alignment ball 94, as will be described in detail below. Opening 92 comprises a chamfer 93 which is sized to receive and have secured inside a portion of alignment ball 94.

Figure 7:
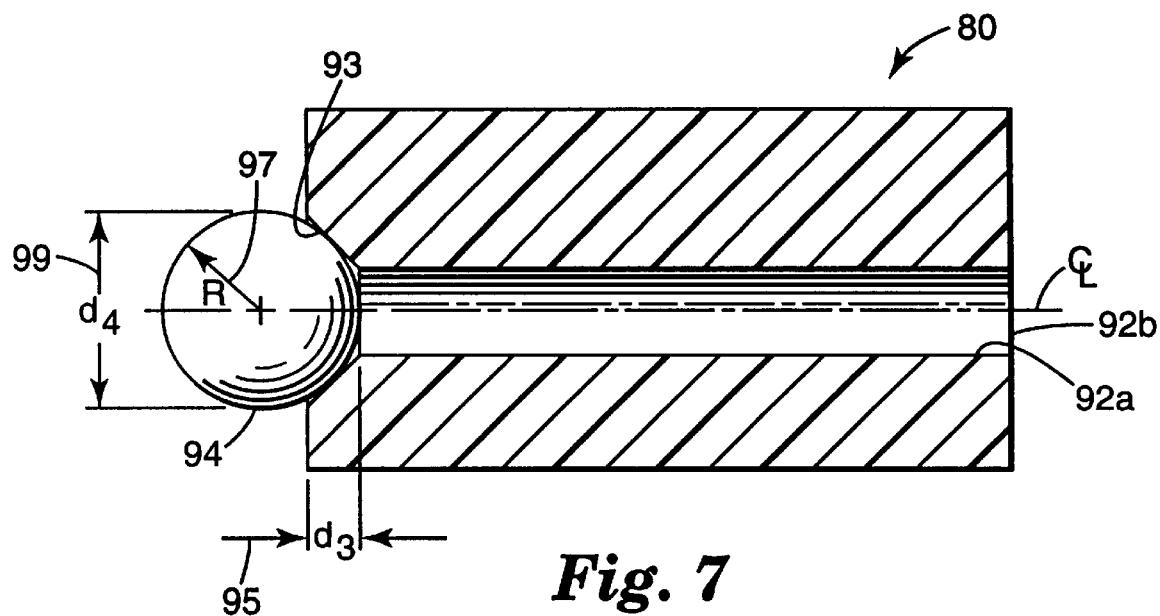
FIG. 7 is a cross sectional view taken along line 7—7 of FIG. 6.

Chamfer 93 can be seen in greater detail in FIG. 7. As can be seen, chamfer 93 is formed to retain less than ½ of alignment ball 94. Specifically, chamfer 93 has a depth $d_3$ indicated at 95 which is less than the radius R, indicated at 97, of alignment ball 94. In the preferred alternate embodiment, alignment ball 94 has a diameter $d_4$, indicated at 99, of approximately 2 mm, therefore it has a radius of approximately 1 mm. Thus, $d_3$ 95 is less than approximately 1 mm and is in range of about 0.5–0.7 mm deep. Once ball 94 has been seated in chamfer 93, a bonding agent is introduced through rear opening 92b, to secure ball 94 in opening 92. It should be noted that it would also be possible to have an alignment assembly without bores 90a, 92a throughout the length of the alignment assembly. A bonding agent could be applied directly to chamfer 93 and then ball 94 could be inserted therein, as long as the bonding agent is uniformly applied so that alignment ball 94 accurately seats in chamfer 93.

Figure 8:
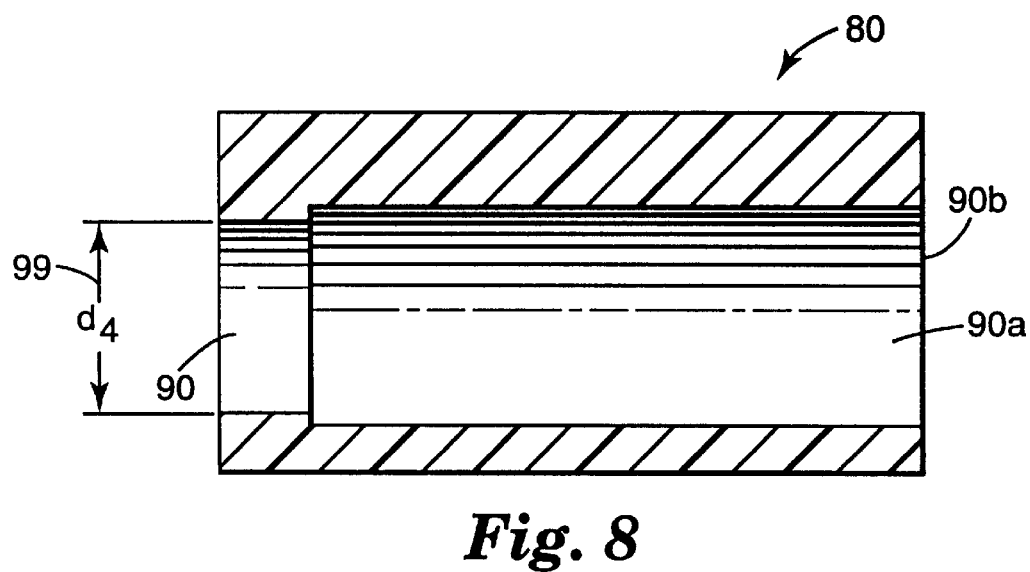
FIG. 8 is a cross sectional view taken along line 8—8 of FIG. 6.

Referring now to FIG. 8, opening 90 is illustrated in greater detail. Opening 90 is sized slightly larger than diameter $d_4$, as indicated at 99. This allows alignment ball 94 to slidingly fit into opening 90. As can be seen in FIG. 8, rear opening 90b and bore 90a are larger than opening 90. This is to reduce the area needed to be machined. Precision is the key to aligning optical fibers, thus opening 90 is machined to very tight tolerances, on the order of 4 or 5 microns. By having bore 90a and rear opening 90b larger than opening 90, a machining tool only has to machine a small surface area.

Precision alignment ball 94 is provided for insertion into opening 92. Ball 94 is provided to precisely align a pair of connector alignment assemblies 80 which in turn precisely align individual fibers of the fiber optic cable secured to the alignment assemblies. Ball 94 is a highly precise steel ball bearing having tolerances in the range of ±0.5 microns for applications using single mode fibers and in the range of ±2 microns for applications using multimode fibers. Ball 94 could also be formed from other materials having the precision of a ball bearing such as tungsten carbide, ceramic, other metals or plastics, such as liquid crystal polymers, without departing from the spirit or scope of the invention. As stated above, ball 94 is bonded into opening 92. The bonding can be achieved by an adhesive or a low melting temperature ceramic seal glass, which would flow at moderately high temperatures, and then bond to both the ceramic or glass fiber alignment block 80 and the alignment ball 94 upon cooling. Other bonding agents may also be used without departing from the spirit or scope of the present invention.

We claim:

1. A method of assembling an optical fiber cable assembly, the method comprising the steps of:

providing an optical fiber cable having at least one optical fiber;

providing at least one pair of connector alignment assemblies, the connector assemblies including connector engagement surfaces and alignment grooves;

positioning the at least one pair of connector alignment assemblies in a face to face arrangement;

positioning a spacing member between the connector engagement surfaces of the at least one pair of connector alignment assemblies;

laying the optical fiber cable over the connector alignment assemblies such that individual fibers of the cable are positioned in each groove of the alignment grooves; and cutting the cable between the connector alignment assemblies.

2. The method of claim 1, wherein the step of providing at least one pair of connector alignment assemblies, includes the steps of:

providing a fiber alignment block having a fiber receiving surface for receiving at least one optical fiber from the cable, the fiber receiving surface having a channel having at least one alignment groove; and providing a securing member sized to fit in the channel.

3. A method of automating the assembly of at least a pair of optical connector alignment assemblies on a continuous optical fiber cable comprising the steps of repeating the method of claim 40 along a continuous length of optical fiber cable.

4. The method of claim 2, further comprising the step of installing the securing member to retain the cable in the alignment grooves.

5. The method of claim 2, wherein the step of providing at least one pair of connector alignment assemblies, includes the step of providing a connector engagement surface having first and second openings and an alignment ball retained in the first opening.

6. The method of claim 2, where in the step of providing an optical fiber cable comprises providing a continuous length of optical fiber cable from a continuous roll.

7. The method of claim 2, wherein the step of cutting the optical fiber cable comprises sawing the optical fiber cable.

8. The method of claim 2, further comprising the step of polishing the optical fiber cable.

9. A method of attaching an optical fiber cable to a connector alignment assembly wherein the cable has a coating jacket thereabout and wherein the connector alignment assembly has a fiber alignment block having a fiber receiving surface for receiving optical fibers from the cable and a connector engagement surface, and a channel formed in the fiber receiving surface, at least one alignment groove formed in the channel, the method including the steps of:

stripping the coating jacket off of a portion of the optical fiber cable;

laying the optical fiber cable over the connector alignment assembly such that the stripped portion of the cable is positioned above the alignment grooves; and cutting any excess cable.

10. The method of claim 9, further comprising the steps of:

providing and a securing member sized to fit in the channel; and installing the securing member to retain the cable in the alignment grooves.

11. A method of abutting a pair of optical fiber cable ends in an aligned position using a pair of connector alignment assemblies wherein the cables are carried on the connector alignment assemblies having a fiber receiving surface for receiving optical fibers from the cables and a connector engagement surface, at least one alignment groove formed in the channel, first and second openings formed in the connector engagement surface, and an alignment ball retained in the first opening, the method including the steps of:

positioning the connector engagement surfaces in a face to face arrangement;

moving the connector alignment assemblies together so that the alignment ball of the first connector is inserted into the second opening of the second connector and the alignment ball of the second connector is inserted into the second opening of the first connector, thus aligning the fibers carried on the connector alignment assemblies.

* * * * *

UNITED STATES PATENT AND TRADEMARK OFFICE
CERTIFICATE OF CORRECTION

PATENT NO.: 5,845,028
DATED: December 1, 1998
INVENTOR(S): Terry L. Smith and Gordon D. Henson It is certified that error appears in the above-identified patent and that said Letters Patent is hereby corrected as shown below:

In the Claims:

Col. 8, Line 61: "method of claim 40" should read -- method of claim 2 -- .

Signed and Sealed this

Thirtieth Day of March, 1999

Attest:

Q. TODD DICKINSON

*Attesting Officer*   *Acting Commissioner of Patents and Trademarks*